(12) United States Patent
Machado et al.

(10) Patent No.: US 7,121,504 B2
(45) Date of Patent: Oct. 17, 2006

(54) HANGING DEVICE TO CONNECT AN ENGINE TO AN AIRCRAFT WING

(75) Inventors: Stephane Machado, Villeneuve-Tolosane (FR); Jerome Cassagne, Toulouse (FR); Anthony Del Blanco, Toulouse (FR); Yvon Martin, Bonrepos Riquet (FR); Arnaud Chambreuil, Labastide Saint Sernin (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/994,483

(22) Filed: Nov. 23, 2004

(65) Prior Publication Data

US 2005/0151008 A1 Jul. 14, 2005

(30) Foreign Application Priority Data

Nov. 25, 2003 (FR) .................................. 03 50906

(51) Int. Cl.
*B64D 27/00* (2006.01)
(52) U.S. Cl. ...................................... 244/54
(58) Field of Classification Search ................ 244/54, 244/55; 248/554, 555; 60/39.31
See application file for complete search history.

(56) References Cited

U.S. PATENT DOCUMENTS 3,042,349 A * 7/1962 Pirtle et al. .................. 248/554
5,806,792 A 9/1998 Brossier et al.
2004/0129832 A1* 7/2004 Marche ........................ 244/54

FOREIGN PATENT DOCUMENTS

| FR | 2 738 034 A1 | | 2/1997 |
| FR | 2738034 A | * | 2/1997 |
| FR | 2 836 672 A1 | | 9/2003 |

OTHER PUBLICATIONS

French patent search report.*

* cited by examiner

*Primary Examiner*—Michael J. Carone
*Assistant Examiner*—Gabriel Klein
(74) *Attorney, Agent, or Firm*—Oblon, Spivak, McClelland, Maier & Neustadt, P.C.

(57) ABSTRACT

The invention relates to a hanging device (1) connecting an engine (2) to a wing (4) of an aircraft, with the device being made up of a rigid structure (8) and hanging equipment (10) interposed between the rigid structure (8) and the wing (4), with the hanging equipment (10) being made up of a forward attachment (14) and a rear attachment (16) made up of at leas one triangular shackle placed in a vertical plane aligned in a transverse direction (Y) of the aircraft. According to the invention, the forward attachment (14) has, on one side and the other of a vertical plane passing through a longitudinal axis (5) of the engine (2), at least one triangular shackle aligned in the longitudinal direction (X) of the aircraft. Furthermore, the hanging equipment is made up exclusively of forward and rear attachments.

12 Claims, 4 Drawing Sheets

HANGING DEVICE TO CONNECT AN ENGINE TO AN AIRCRAFT WING

TECHNICAL FIELD

The present invention relates to a device which is capable of connecting an engine to the wing of an aircraft, with this device comprising a rigid structure and hanging equipment placed between this rigid structure and the wing. In particular the invention relates to a device which is capable suspending an engine beneath the wing of an aircraft, with this device comprising a rigid structure and equipment for hanging this rigid structure beneath the wing.

Such a device may be used on any type of aircraft which has engines suspended from its wings or mounted above them, such as jet or turbo-prop aircraft.

STATE OF THE ART

On existing aircraft, engines are suspended below the wing using complex hanging devices, also known as "EMS" (from the English term "Engine Mounting Structure"). In the case of jet engines, the hanging devices that are usually employed display a rigid box-type structure, also known as an "engine pylon", that is, one which is formed by the upper and lower spar assembly connected together by means of multiple transverse ribs. On the other hand, hanging devices for turbo-prop engines are usually made up of a rear underwing box, extended forwards by means of a truss structure in the longitudinal direction of the turbo-prop engine.

As is well known, these devices are designed in particular to transmit static and dynamic forces produced by the engines such as weight, thrust, or various other dynamic forces, to the wings.

To this end, in previously existing hanging devices, the transmission of forces between these and the wings is traditionally achieved through a forward attachment, a rear attachment and an intermediate attachment, intended in particular to take up thrust forces.

In order to do this, the forward attachment is composed of two groups of shackles, respectively placed on either side of the rigid structure. Each group of shackles connects a double headed bracket that is part of the upper spars of the rigid structure of the device, to a double headed bracket that is part of a front spar of the wing. The groups of shackles and the brackets are connected using pins aligned in a transverse direction relative to the aircraft, that is, in a direction that is orthogonal to both the vertical and the longitudinal axes of the aircraft.

The rear attachment is made up of two pairs of triangular shackles placed in vertical planes and aligned in the transverse direction of the aircraft. These two pairs of triangular shackles connect a double bracket that is a fixed part of the rear upper spar of the rigid structure to a bracket that is a fixed part of an intermediate spar of the wing. Here, then, the connections between both pairs of shackles and the brackets comprise pins aligned in the longitudinal direction of the aircraft.

The intermediate attachment intended to take up thrust forces, also known as the "spigot" attachment is usually constructed using a ball and socket pivot fixed in a vertical axis into the rear upper spar of the rigid structure, between the forward attachment and rear attachment. This spigot attachment is a shear pin fixed beneath the aircraft wing, so as to extend vertically into the above mentioned ball and socket.

In this currently existing traditional and isostatic design, longitudinal forces (thrust, inverters) are transmitted through the intermediate attachment. Transverse forces are distributed between this intermediate attachment and the rear attachment, whilst forces in the vertical direction pass simultaneously through the forward and rear attachment.

In addition, the moment along the longitudinal axis is taken up by the forward attachment, and the moment along the transverse axis is taken up in the vertical direction by the assembly formed by the forward and rear attachments. Finally, the moment along the vertical axis is taken up in the transverse direction by the assembly formed by the intermediate attachment and the rear attachment.

Although the solution that has just been presented allows static and dynamic forces that are generated by engines to be transmitted in a satisfactory manner under all flying conditions, it does nevertheless have significant disadvantages.

In effect, it can be said that insofar as the principal function of the intermediate attachment is to take up thrust forces, it must necessarily offer significant bulk as well as a relatively high mass. This naturally leads to a noticeable increase in the overall mass of the hanging device.

On the other hand, it should be noted that the solidly fixed shear pin fixing plate required for the assembly of the hanging device beneath the aircraft wing is a component with a complex design that is difficult to specify. This is explained clearly by the necessity of having to align and mate this plate with the constituent elements of the wing structure, principally, that is, with the spars and ribs.

OBJECT OF THE INVENTION

The purpose of the invention is therefore to propose a hanging device for connecting and engine to an aircraft wing, with this device remedying, at least partially, the above mentioned disadvantages relating to the formerly used constructions.

More precisely, the purpose of the invention is to present a hanging device for connecting the engine to a wing of an aircraft, made up in particular of hanging equipment interposed between this rigid structure and the wing, and where the design of this equipment is noticeably simplified in relation to that previously encountered.

In order to do this, the object of the invention is a hanging device for connecting and engine to an aircraft wing, with the device being made up of a rigid structure and hanging equipment interposed between this rigid structure and the wing with this hanging equipment comprising a forward attachment and a rear attachment comprising at least one triangular shackle placed in a vertical plane and aligned in a direction transverse to the aircraft, with this forward attachment being comprising two half-attachments arranged respectively on one side and the other of a vertical plane passing along a longitudinal axis of the engine. According to the invention, each half-attachment comprises at least one triangular shackle placed in a vertical plane aligned along a longitudinal direction of the aircraft and the hanging equipment are made up exclusively of the abovementioned forward and rear attachments.

The design of the hanging equipment for the device according to the invention has the advantage of being significantly simplified in relation to those previously encountered, principally due to the fact that the intermediate spigot type attachment is no longer required.

In fact, in this isostatic arrangement in the present invention, longitudinal forces are transmitted through each of the half-attachments of the forward attachment, transverse forces are transmitted through the rear attachment and forces along the vertical direction pass simultaneously through the two forward half-attachments and the rear attachment, each of which is made up of at least one triangular shackle.

Thus the removal of this intermediate spigot type attachment inevitably results in a considerable diminution of the mass and bulk relating to the hanging equipment, and consequently a significant reduction in the overall mass and cost of the hanging device.

The rear attachment is preferably comprising a pair of triangular shackles in vertical planes aligned along the transverse direction of the aircraft, and the forward attachment made up, on either side of the vertical plane passing through the longitudinal axis of the engine, of a pair of triangular shackles placed in vertical planes aligned along the longitudinal direction of the aircraft. Naturally, the fact that a pair of shackles is involved means that mechanical strength characteristics are obtained that are superior to those obtained with solutions using single shackles.

It could be arranged therefore for the pair of triangular shackles on the rear attachment to be connected to the rigid structure and to the wing of the aircraft using pins aligned along the longitudinal direction of the aircraft. In the same way, it could also be arranged for the two pairs of triangular shackles on the forward attachment to be connected to the rigid structure and to the wing of the aircraft using pins aligned along the transverse direction of the aircraft.

Preferably, the rear attachment is in addition comprising a bracket integral with the rigid structure, linked to the pair of triangular shackles by means of at least one pin aligned along the longitudinal direction of the aircraft, and the rear attachment also comprising a bracket integral with the wing, linked to the pair of triangular shackles by means of at least one pin aligned along this same longitudinal direction.

In an analogous manner, the forward attachment is preferably including two brackets integral with the rigid structure, with each bracket connected to one of the two pairs of triangular shackles by means of at least one pin aligned along the transverse direction of the aircraft, and the forward attachment also including two brackets integral with the wing, with each bracket being connected to one of two pairs of triangular shackles by means of at least one pin aligned along the transverse direction of the aircraft.

In addition, for the forward and rear attachments, each triangular shackle is connected to the rigid structure and to the wing of the aircraft using three pins passing through it, preferably perpendicularly, respectively near its three apices.

In the first preferred option for construction of the present invention, at least one triangular shackle is connected to the rigid structure by one of its bases and to the wing by the apex opposite this base. In other terms, at least one triangular shackle is arranged so that it extends vertically upwards from one of its bases towards the apex opposite this base.

In a second preferred option for construction of the present invention, at least one triangular shackle is connected to the rigid structure by one of its apices and to the wing by the base opposite this apex. Here also, this means that at least one triangular shackle is arranged so that it extends vertically downwards from one of its bases towards the apex opposite this base.

Other advantages and characteristics of the invention will appear in the detailed non-restrictive description below.

BRIEF DESCRIPTION OF THE DRAWINGS

This description will be made in relation to the appended drawings, amongst which are.

DETAILED DESCRIPTION OF PREFERRED EMBODIMENTS

Figure 1:
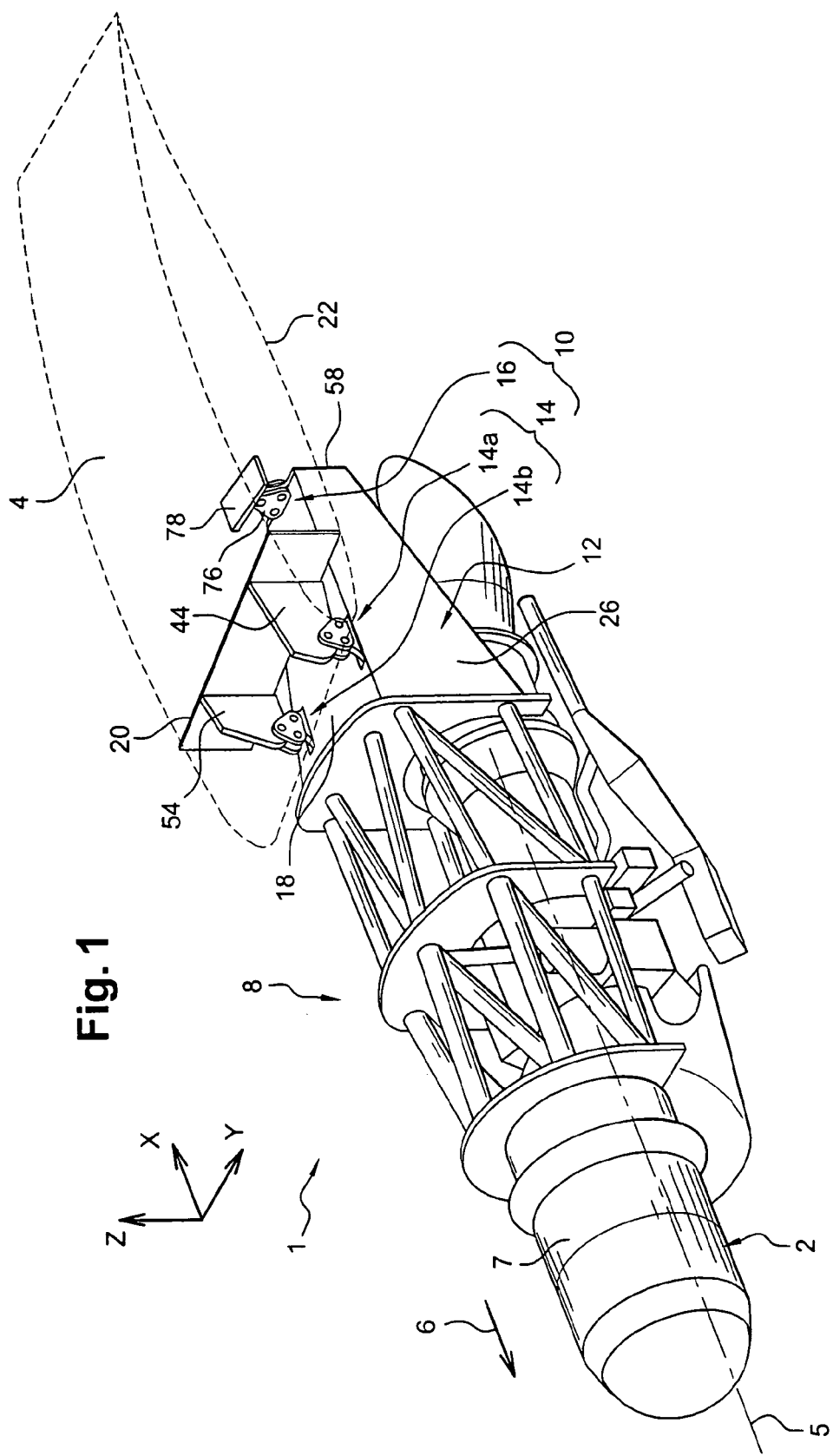
FIG. 1 represents a perspective view of a hanging device for connecting an engine to an aircraft wing, in accordance with a first preferred embodiment of the present invention.

Referring to FIG. 1, a hanging device 1 can be seen that is in accordance with a first preferred embodiment of the present invention, with the device 1 being intended to perform the suspension of a turbo prop engine 2 beneath a wing of an aircraft represented only schematically, for obvious reasons of clarity, and designated in general terms by numeric reference 4. It should be noted that the hanging device 1 represented in this FIG. 1 is adapted to connect with a turbo-prop engine 2, but it could of course involve a device designed to suspend any other type of engine, such as a jet engine, without going outside the scope of this invention. Furthermore, although device 1 of the first preferred embodiment is designed to carry out the suspension of an engine 2 beneath wing 4, it should be noted that it could also be constructed to allow the mounting of an engine 2 above the same wing 4.

In all of the description to follow, by convention, the direction parallel to a longitudinal axis 5 of the engine 2 is called X, the direction transverse to the aircraft is Y and the vertical direction Z, with these three directions being orthogonal to each other. Thus, it should be understood that the directions X, Y and Z correspond respectively to longitudinal direction, transverse direction and height for both the aircraft and for engine 2.

It should be specified that the longitudinal axis 5 of engine 2 is to be understood as being the longitudinal axis of the engine casing, and not the longitudinal axis of its propulsion fan 7.

On the other hand, the terms "forward" and "rear" are to be regarded in relation to a direction of forward motion of the aircraft experienced as a result of the thrust exerted by the engines 2, with this direction being schematically represented by arrow 6.

In FIG. 1, it can be seen that only one rigid structure 8 of the hanging device 1 has been shown, accompanied by the hanging equipment 10 interposed between this rigid structure 8 and the wing 4 of the aircraft, with the equipment 10 naturally belonging to the hanging device 1 and performing the task of hanging this rigid structure 8 beneath wing 4. The other constituent elements of this device 1 that are not represented, of a secondary type of structure which ensure the segregation and maintenance of systems whilst supporting aerodynamic cowlings are standard elements that are identical or similar to those encountered in current technology and well known to professionals working in the field. There will consequently be no detailed description of these.

In the same way, since the rigid structure 8 is similar to those encountered in devices found in existing technology, and which in all ways offers a specific and different design and function from the nature of the engine that it is to suspend, it will consequently be described no further.

On the other hand, the hanging equipment 10, located overall towards the rear of the rigid structure 8, and more specifically in an under-wing box 12 in the case represented by a rigid turboprop engine structure, is specified in the present invention and will therefore be presented in a detailed manner below.

In general, the attachment equipment 10 is composed of a forward attachment 14 and a rear attachment 16. As will be explained in detail below, the forward attachment 14 connects an upper spar of the under-wing box 12 of rigid structure 8 to a forward vertical spar 20 which is an integral part of the wing structure 4 and which more or less extends along a main longitudinal direction (not represented) of the same wing 4.

On the other hand, the rear attachment 16 connects one rear end of the upper spar 18 of the under-wing box 12 to an intermediate horizontal spar (not represented) which forms an integral part of the structure of the wing 4 and which also more or less extends along the main longitudinal direction of the same wing 4.

As can be seen in FIG. 1, the forward attachment 14 is in fact composed of two half-attachments 14*a* and 14*b*, which are more or less identical and which are arranged on both sides of a vertical plane (not represented) passing through the longitudinal axis 5 of the engine 2, and which are preferably arranged symmetrically in relation to this plane. For this reason, details of only one of the two half-attachments 14*a* and 14*b* will be given below.

Figure 2:
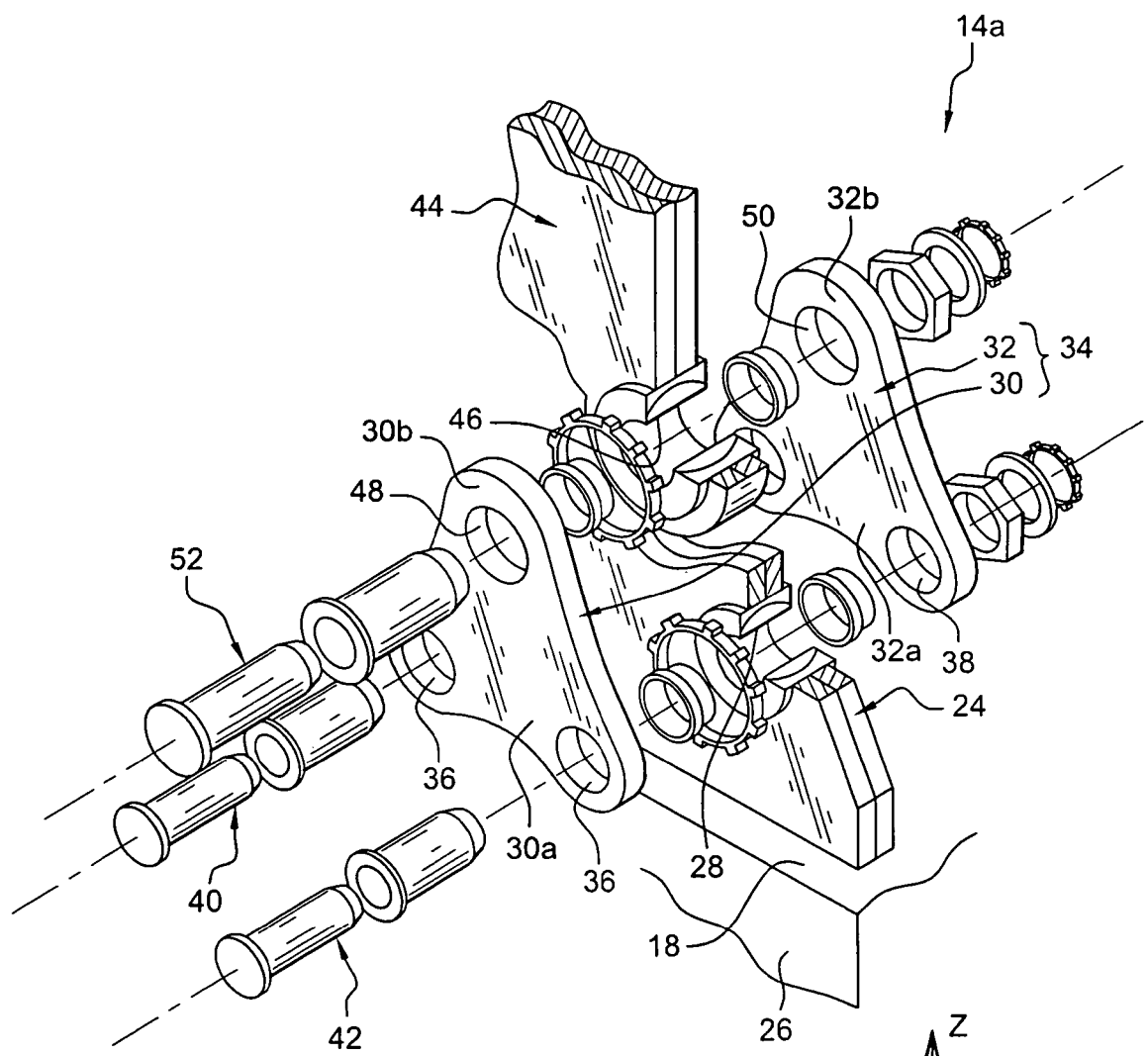
FIG. 2 represents an enlarged exploded perspective view of a part of the forward attachment of the hanging device in FIG. 1.

With reference more specifically to FIG. 2, it can be seen that that the half-attachment 14*a* is first of all comprising a bracket 24, preferably doubled, which is part of the spar 18 of the under-wing box 12. This bracket 24 lies in a vertical plane aligned along the horizontal direction X, that is, along a plane XZ, almost in the extension of a lateral panel 26 of the under-wing box 12. In addition, it has two through-holes 28 drilled in it (only one is visible in FIG. 2), aligned along the transverse direction Y of the aircraft.

Two triangular shackles 30 and 32, preferably identical and roughly in the form of an equilateral triangle, are arranged respectively on either side of the bracket 24, also in the XZ planes. Thus the outer shackle 30 and the inner shackle 32 together form a pair of triangular shackles 34, with the shackles 30, 32 in parallel to each other. On this point it is specifically stated that the pair of triangular shackles 34 could also be manufactured using double shackles without going outside the scope of the invention. In such a case, the pair of shackles 34 would then be made up of four identical shackles distributed as two assemblies of two superimposed triangular shackles, respectively arranged on either side of the bracket 24.

In this first preferred embodiment of the present invention, the outer shackle 30 is arranged so that one of its bases 30*a* is mounted on the bracket 24, with this base 30*a* being more or less aligned along the longitudinal direction X. In this way, it may be understood that shackle 30 is placed so that it extends vertically upwards along direction Z, from its base 30*a* to an apex 30*b* opposite this base 30*a*.

Thus, close to each of the two apices (not referenced) associated with this base 30*a*, there is a through-hole 36, aligned along the transverse direction Y. In the same manner, the inner shackle 32 is arranged in an identical manner to that of outer shackle 30, namely that one of its bases 32*a* is mounted onto the bracket 24, and that this base 32*a* is more or less aligned along the longitudinal direction X. Consequently, there is also a through-hole here aligned along the transverse direction Y, close to each of the two apices (not referenced) associated with this base 32*a*.

In order to connect the pair of shackles 34 to the bracket 24, the half-attachment 14*a* also has two pins 40 and 42 aligned along transverse direction Y and arranged in the same horizontal plane XY. This means that the forward pin 40, preferably doubled as shown in FIG. 2, successively passes through one of the two through-holes 36 in the external triangular shackle 30, one of the two through-holes 28 made in the bracket 24 and one of the two through-holes 38 in the inner triangular shackle 32. In an analogous manner, the rear pin 42, preferably also double, passes successively through the other of the two holes 36 in the outer triangular shackle 30, the other of the two through-holes 28 made in 24, and the other of the two through-holes 38 in the inner triangular shackle 32.

In addition, the half-attachment 14*a* is equipped with another bracket 44 aligned in a vertical plane XZ which takes the form of a rib of the structure of wing 4, with this rib 44 being a part of spar 20 as is clearly shown in FIG. 1. A single through-hole 46 aligned along the transverse direction Y of the aircraft is drilled in the forward lower part of this bracket 44 which is aligned vertically in the longitudinal direction X.

To fix the pair of triangular shackles 34 onto this bracket 44, the outer shackle 30 possesses a through-hole 48 aligned along the transverse direction Y, with this hole 48 made close to the apex 30*b* opposite the abovementioned base 30*a*. In an analogous manner, inner pin 32 possesses a through-hole 50 aligned along the transverse direction Y, with this hole 50 made close to an apex 32*b* opposite the base 32*b* indicated earlier.

With such an arrangement, an upper pin 52 aligned along the transverse direction Y, arranged above pins 40 and 42 and preferably being doubled as shown in FIG. 2, may also be used to connect the pair of shackles 34 and bracket 44, by successively passing through the through-hole 48 in the outer triangular shackle 30, the through-hole 46 in the bracket 44 and the through-hole 50 in the inner triangular shackle 32.

As has been mentioned above, the half-attachment 14*b* will not be described further, in as much as only the length along direction X of its bracket 54 interposed between the spar 20 and the pair of triangular shackles (not referenced) differs in relation to the length along direction X of the bracket 44 of half-attachment 14*a*. Naturally, this is explained by the positioning of the spar 20 of wing 4, which is located in a vertical plane which is inclined in relation to a plane YZ.

Figure 3:
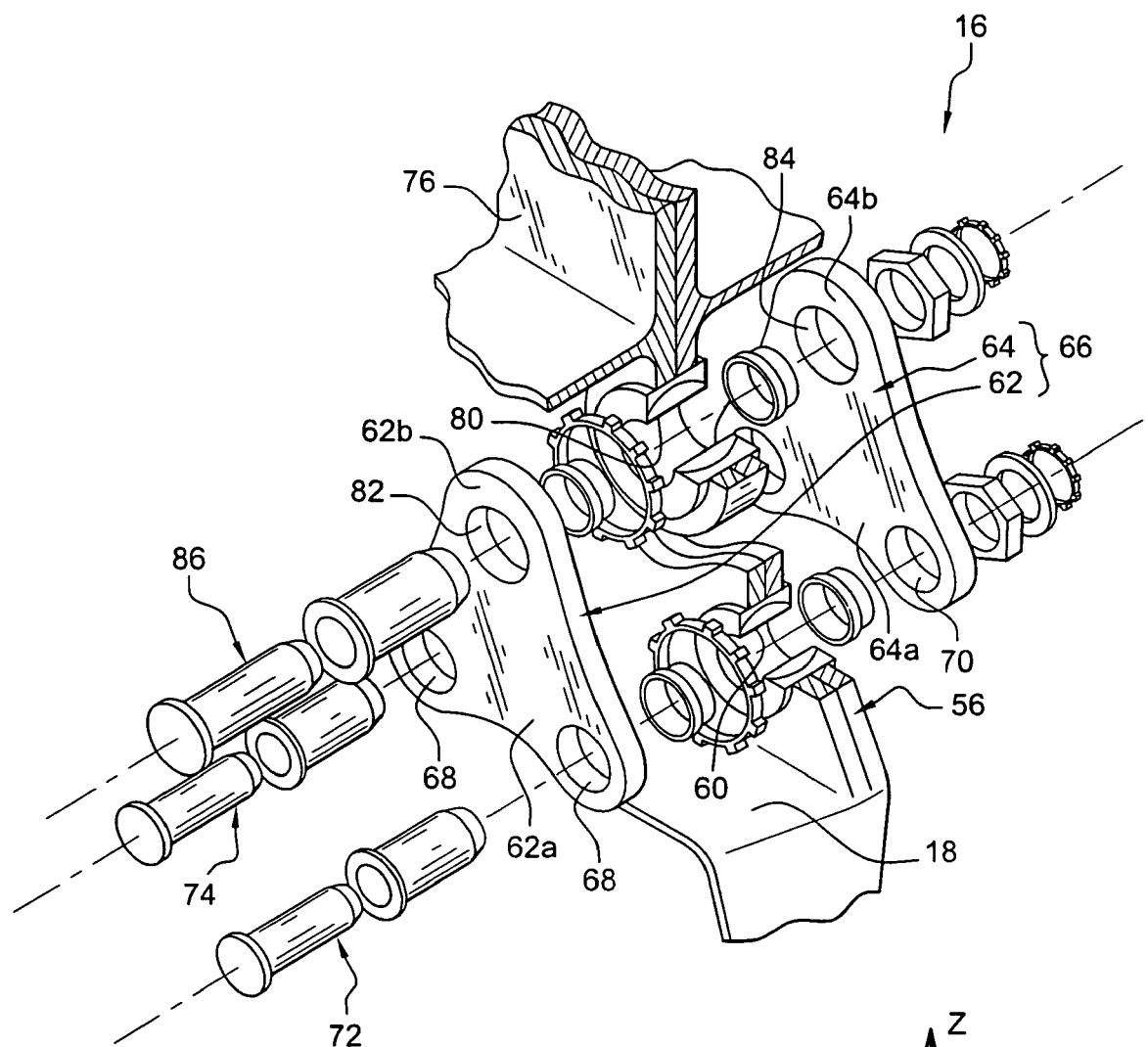
FIG. 3 represents an enlarged exploded perspective view of the rear attachment of the hanging device in FIG. 1.

Now in reference to FIG. 3, it can be seen that the rear attachment 16, which is more or less identical to the half-attachments 14*a*, 14*b* is made up of a double bracket 56 which forms part of the rear extremity of the spar 18 of under-wing box 12. This bracket 56 lies in a vertical plane aligned along the transverse direction Y, that is, in a plane YZ, almost as an extension of a rear vertical box 58 of the under-wing box 12. In addition, the bracket 56 is symmetrical in relation to the vertical plane which passes through the longitudinal axis 5 of engine 2.

There are two through-holes 60 in this bracket 56 (with only one being visible in FIG. 3), aligned along the longitudinal direction X of the aircraft.

Two triangular shackles 62 and 64, preferably identical and roughly in the form of an equilateral triangle, are arranged respectively on either side of the bracket 56, also in planes YZ. Thus the forward shackle 62 and the rear shackle 64 together form a pair of triangular shackles 66, of which the shackles 62, 64 are parallel to each other. On this point it should be pointed out that the pair of triangular shackles 66 could here also be manufactured using double shackles without going outside the scope of the invention.

In this first preferred embodiment of the present invention, the forward shackle 62 is arranged so that one of its bases 62a is mounted on the bracket 56, with this base 62a being more or less aligned along the transverse direction Y. In this way, it may be understood that shackle 62 is placed so that it extends vertically upwards along direction Z, from its base 62a to an apex 62b opposite this base 62a.

Thus, close to each of the two apices (not referenced) that are associated with this base 62a, there is a through-hole 68, aligned along the longitudinal direction X. In the same manner, the rear shackle 64 is arranged in an identical manner to that of forward shackle 62, namely that one of its bases 64a is mounted onto the bracket 56, and that this base 64a is more or less aligned along the transverse direction Y. Consequently, there is also a through-hole 70 here which is aligned along the longitudinal direction X, close to each of the two apices (not referenced) associated with this base 64a.

In order to connect the pair of shackles 66 to the bracket 56, the rear attachment 16 therefore has two lateral pins 72 and 74 aligned along the longitudinal direction Y and arranged in the same horizontal plane XY. This means that the lateral pin 72, preferably doubled as shown in FIG. 3, successively passes through one of the two through-holes 68 in the forward triangular shackle 62, one of the two through-holes 60 made in the bracket 56 and one of the two through-holes 70 in the rear triangular shackle 64. In an analogous manner, the rear pin 74, preferably also doubled, passes successively through the other of the two holes 68 in the forward triangular shackle 62, the other of the two through-holes 60 made in bracket 56, and the other of the two through-holes 70 in the rear triangular shackle 64.

In addition, the rear attachment 16 is provided with another bracket 76 with an overall alignment in a vertical plane YZ and extending upwards through a horizontal plate 78, with this plate forming part of the horizontal intermediate spar of the wing 4. Consequently, bracket 76 passes through a skin on the lower wing surface 22 of wing 4.

There is a single through-hole 80, aligned along the longitudinal direction of the aircraft, in the lower part of this bracket 76.

To fix the pair of triangular shackles 66 onto this bracket 76, the forward shackle 62 possesses a through-hole 82 aligned along the longitudinal direction X, with this hole 82 made close to the apex 62b opposite the abovementioned base 62a. In an analogous manner, the rear shackle 64 possesses a through-hole 84 aligned along the longitudinal direction X, with this hole 84 made close to an apex 64b opposite the base 32a indicated earlier.

With such an arrangement, an upper pin 86, arranged above pins 72 and 74 and preferably being doubled as shown in FIG. 3, may therefore be used to connect the pair of shackles 66 and bracket 76, by successively passing through the through-hole 82 in the forward triangular shackle 62, the through-hole 80 in the bracket 76 and the through-hole 84 in the rear triangular shackle 64.

In this isostatic arrangement of the present invention, longitudinal forces (thrust, inverters) are transmitted through the forward attachment 14. Transverse forces are transmitted through rear attachment 16, whilst forces in the vertical direction pass simultaneously through forward attachment 14 and rear attachment 16. It should be noted that with such a configuration, longitudinal forces travel directly through ribs 44 and 54 of the structure of wing 4, with these ribs 44 and 54 being located overall towards the rear in relation to the half-attachments 14a and 14b. Furthermore, it should be understood that each half-attachment 14a, 14b is designed so as to take up and transmit forces along the X and Z directions, and not along the Y direction. Similarly, rear attachment 16 is designed so as to take up and transmit forces along the Y and Z directions and not along the X direction.

In addition, the moment along the longitudinal axis is taken up in the vertical direction by the two half-attachments 14a and 14b of forward attachment 14, and the moment along the transverse axis is also taken up in the vertical direction by the assembly made up of forward attachment 14 and rear attachment 16. Finally, the moment along the vertical axis is taken up in the longitudinal direction by the two half-attachments 14a and 14b of forward attachment 14.

Figure 4:
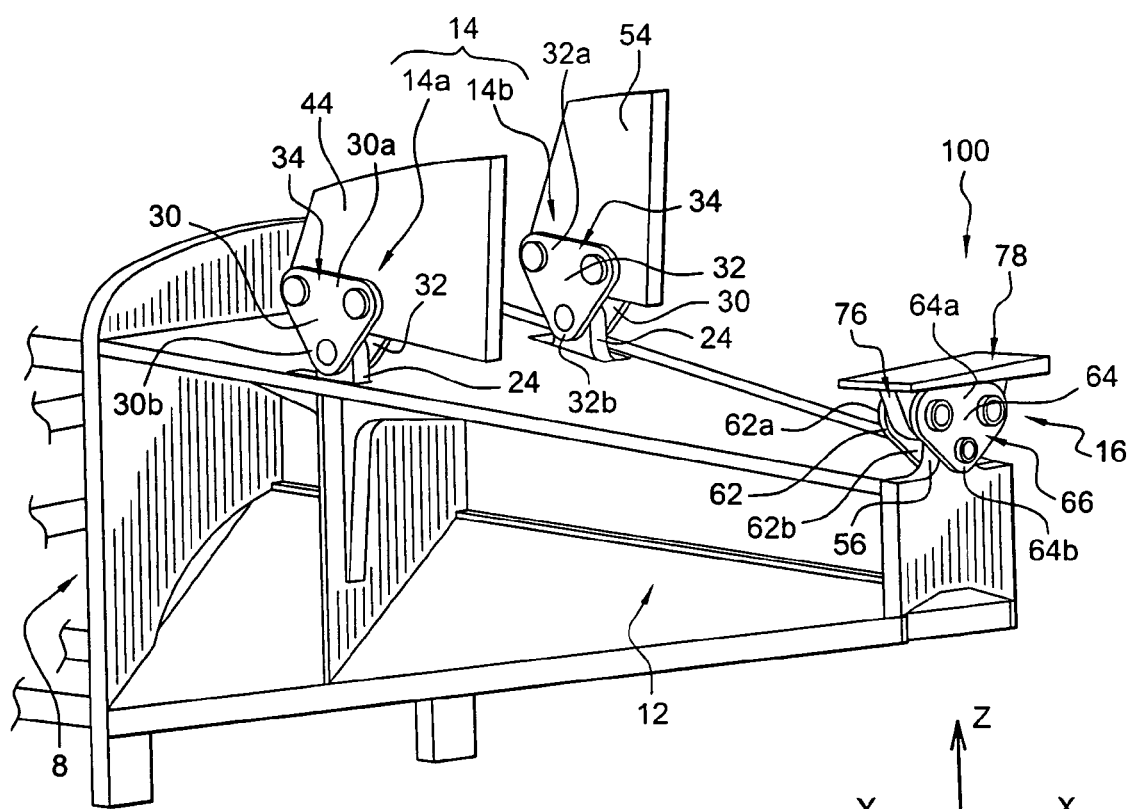
FIG. 4 represents a partial perspective view of a hanging device for connecting an engine to an aircraft wing, in accordance with a second preferred embodiment of the present invention.

In reference to FIG. 4, a part of hanging device 100 can be seen in a second preferred embodiment of the present invention. The device 100 is more or less identical to device 1 in the first option for construction described above. Consequently, the elements which bear the same numerical references correspond to similar or identical elements.

Thus it can be seen in FIG. 4 that the changes between hanging devices 1 and 100 are due to the arrangements of the shackles that belong to the forward attachment 14 and rear attachment 16 of the hanging equipment 10.

Effectively, if the set of triangular shackles 30, 32, 62, 62 of device 1 were located so that they lay vertically upwards, from one of their bases towards the apex opposite this base, these same triangular shackles in device 100 also lie vertically, but going downwards from one of their bases towards the apex opposite this base. In other terms, the triangular shackles of pairs of shackles 34 and 36 have been pivoted through 180° respectively in transverse direction Y and longitudinal direction X relative to the positions they occupied in the first option for construction.

Consequently, as is clearly visible in FIG. 4, bases 30a and 32a of the two half-attachments 14a and 14b of the forward attachment 14 are connected to brackets 44 and 54 of wing 4, and the opposite apices 30b and 32b are connected to brackets 24 forming part of the rigid structure 8.

On the other hand, bases 62a and 64a of rear attachment 16 are connected to bracket 76 forming a part of wing 4, and opposite apices 62b and 64b are connected to bracket 56 forming part of rigid structure 8.

Naturally, various modifications can be made by professionals working in this field to the hanging devices 1 and 100 that have just been described as non-restrictive examples.

The invention claimed is:

1. A hanging device connecting an engine to an aircraft wing, said device comprising a rigid structure and hanging equipment interposed between said rigid structure and the wing, said hanging equipment comprising:

a forward attachment and a rear attachment including at least one triangular shackle placed in a vertical plane aligned along a transverse direction (Y) of the aircraft, said forward attachment being formed of two half-attachments arranged respectively on one side and the other of a vertical plane passing through a longitudinal axis of the engine, wherein each half-attachment comprises at least one triangular shackle placed in a vertical plane aligned along a longitudinal direction (X) of the aircraft, and so that said hanging equipment is made up exclusively of said forward and rear attachments;

wherein the rear attachment is made up of a pair of triangular shackles placed in vertical planes aligned along the transverse direction (Y) of the aircraft, and wherein the forward attachment is made up, on one side and the other of the vertical plane passing through the longitudinal axis of the engine, of a pair of triangular shackles placed in vertical planes aligned along the longitudinal direction (X) of the aircraft; and wherein said rear attachment comprises a bracket integral with the rigid structure, connected to said pair of shackles by at last one pin aligned in the longitudinal direction (X) of the aircraft, and wherein said rear attachment further comprises a bracket integral with the wing, connected to said pair of triangular shackles by at least one pin aligned in the longitudinal direction (X) of the aircraft.

2. The hanging device for an engine as claimed in claim 1, wherein said pair of triangular shackles on the rear attachment are connected to the rigid structure and to the wing of the aircraft with pins aligned along the longitudinal direction (X) of the aircraft.

3. The hanging device for an engine as claimed in claim 1, wherein each of the two half-attachments of the forward attachment includes a pair of triangular shackles and each of the two pairs of triangular shackles on the forward attachment is connected to the rigid structure and to the wing of the aircraft using pins aligned along the transverse direction (Y) of the aircraft.

4. The hanging device for an engine as claimed in claim 3, wherein each pair of triangular shackles is connected to the rigid structure and to the wing of the aircraft with a pin through a triangular shackle of said each pair, wherein said pin is located close to an apex of said triangular shackle.

5. The hanging device for an engine as claimed in claim 1, wherein at least one triangular shackle is connected to the rigid structure by a base of said one triangular shackle, and to the wing by an apex opposite said base.

6. The hanging device for an engine as claimed in claim 1, wherein at least one triangular shackle is connected to the rigid structure by an apex of said one triangular shackle, and to the wing by a base opposite said apex.

7. The hanging device for an engine as claimed in claim 1, wherein said forward attachment connects the rigid structure to a forward span of the wing.

8. The hanging device for an engine as claimed in claim 7, wherein said forward attachment is free of any intermediate attachment between said two half-attachments.

9. The hanging device for an engine as claimed in claim 7, wherein said forward attachment is free of any attachment, in addition to said two half-attachments, connecting said rigid structure and said forward span of said wing.

10. The hanging device for an engine as claimed in claim 7, wherein said hanging equipment is free of any attachment, in addition to said forward and rear attachments, connecting said rigid structure and said wing.

11. The hanging device for an engine as claimed in claim 1, wherein each of the two half-attachments is designed in order to take up and transmit forces along longitudinal direction (X) and along vertical direction (Z), and that said rear attachment is designed in order to take up and transmit forces along transversal direction (Y) and vertical direction (Z).

12. A hanging device connecting an engine to an aircraft wing, said device comprising a rigid structure and hanging equipment interposed between said rigid structure and the wing, said hanging equipment comprising:

a forward attachment and a rear attachment including at least one triangular shackle placed in a vertical plane aligned along a transverse direction (Y) of the aircraft, said forward attachment being formed of two half-attachments arranged respectively on one side and the other of a vertical plane passing through a longitudinal axis of the engine, wherein each half-attachment comprises at least one triangular shackle placed in a vertical plane aligned along a longitudinal direction (X) of the aircraft, and so that said hanging equipment is made up exclusively of said forward and rear attachments;

wherein the rear attachment is made up of a pair of triangular shackles placed in vertical planes aligned along the transverse direction (Y) of the aircraft, and wherein the forward attachment is made up, on one side and the other of the vertical plane passing through the longitudinal axis of the engine, of a pair of triangular shackles placed in vertical planes aligned along the longitudinal direction (X) of the aircraft; and wherein said forward attachment comprises two brackets integral with the rigid structure, with each bracket connected to said pair of triangular shackles by at last one pin aligned in the transverse direction (Y) of the aircraft, and wherein said forward attachment further comprises two brackets integral with the wing, with each bracket being connected to one of the two pairs of triangular shackles by at least one pin aligned in the transverse direction (Y) of the aircraft.

* * * * *